US008718170B2

(12) United States Patent
Nissani (Nissensohn)

(10) Patent No.: US 8,718,170 B2
(45) Date of Patent: May 6, 2014

(54) LATTICE CODED MIMO TRANSMISSION METHOD AND APPARATUS

(76) Inventor: Daniel Nathan Nissani (Nissensohn), Tel Aviv (IL)

( * ) Notice: Subject to any disclaimer, the term of this patent is extended or adjusted under 35 U.S.C. 154(b) by 185 days.

(21) Appl. No.: 13/199,844

(22) Filed: Sep. 12, 2011

(65) Prior Publication Data

US 2013/0064320 A1    Mar. 14, 2013

(51) Int. Cl.
H04B 7/02          (2006.01)
(52) U.S. Cl.
USPC .......................................... 375/267; 375/299
(58) Field of Classification Search
USPC ................................................. 375/347, 349
See application file for complete search history.

(56) References Cited

U.S. PATENT DOCUMENTS

| 7,583,763 | B2 | 9/2009 | Nissani (Nissensohn) | |
|---|---|---|---|---|
| 2002/0126773 | A1* | 9/2002 | Brunel | 375/340 |
| 2006/0034381 | A1* | 2/2006 | Ionescu et al. | 375/267 |
| 2006/0159195 | A1* | 7/2006 | Ionescu et al. | 375/267 |
| 2007/0183533 | A1* | 8/2007 | Schmidl et al. | 375/299 |
| 2007/0201632 | A1* | 8/2007 | Ionescu | 379/88.01 |
| 2008/0285975 | A1* | 11/2008 | Lee et al. | 398/98 |
| 2012/0008663 | A1* | 1/2012 | Schilling | 375/146 |

OTHER PUBLICATIONS

Telatar, I.E., 'Capacity of multi-antenna Gaussian channels', Technical Memorandum, Bell Laboratories, Lucent Technologies, Oct. 1995.
Conway, J.H., Sloane, N.J.A., 'Sphere Packings, Lattices and Groups', Springer-Verlag, 3rd Edition, 1998.
Sommer, N., Feder M., Shalvi, O., 'Low Density Lattice Codes', IEEE International Symposium on Information Theory, Seattle, Jul. 2006.
Lang, G.R., Longstaff, F.M., 'A Leech Lattice Modem', IEEE JSAC, Aug. 1989.
Forney, G.D., Gallager, R.G., Lang, G.R., Longstaff, F.M., Qureshi, S.U., 'Efficient Modulation for Band-Limited Channels', IEEE JSAC, Sep. 1984.
Gallager, R.G., 'Low Density Parity Check Codes', Ph D Dissertation, MIT, 1963.
Yona, Y., Feder, M., 'Efficient Parametric Decoder of Low Density Lattice Codes', ISIT 2009, Jul. 2009.
Viterbo, E., Boutros, J., 'A universal lattice code decoder for fading channels', IEEE Transactions on IT, Jul. 1999.
Forney, G.D., 'Coset Codes—Part I: Introduction and Geometrical Classification', IEEE Transactions on IT, Sep. 1988.
Conway, J.H., Sloane, N.J.A., 'Fast Encoding Method for Lattice Codes and Quantizers', IEEE Transactions on IT, Nov. 1983.
Duda, R.O., Hart, P.E., 'Pattern Classification and Scene Analysis', John Wiley & Sons, 1973.
U.S. Appl. No. 12/074,287, Nissani (Nissensohn), D.N.
U.S. Appl. No. 12/455,287, Nissani (Nissensohn), D.N.
U.S. Appl. No. 12/806,065, Nissani (Nissensohn), D.N.

* cited by examiner

Primary Examiner — Emmanuel Bayard

(57) ABSTRACT

A method and corresponding apparatus for signal space information encoding through a multi-input-multi-output communication system of given dimension, with no or little degradation in link performance (relative to non-multi-input-multi-output systems), said method and corresponding apparatus comprising, splitting said information into at least as many separate parts as said dimension of said multi-input-multi-output communication system, separately signal space encoding each of these said parts, and transmitting each of said separate encoding results on a selected dimension of said multi-input-multi-output communication system along sequential usages of the transmission channel.

20 Claims, 3 Drawing Sheets

LATTICE CODED MIMO TRANSMISSION METHOD AND APPARATUS

CROSS REFERENCE TO RELATED APPLICATIONS

Not Applicable.

STATEMENT REGARDING FEDERALLY SPONSORED RESEARCH OR DEVELOPMENT

Not Applicable

CITED REFERENCES

The following references are cited within this invention description:
[1] Telatar, I. E., 'Capacity of multi-antenna Gaussian channels', Technical Memorandum, Bell Laboratories, Lucent Technologies, October 1995
[2] Conway, J. H., Sloane, N. J. A., 'Sphere Packings, Lattices and Groups', Springer-Verlag, 3rd Edition, 1998
[3] Nissani (Nissensohn), D. N., 'Memory Capacity Enhancement Method and Apparatus', March 2008, U.S. application Ser. No. 12/074,287
[4] Nissani (Nissensohn), D. N., 'Memory Capacity Enhancement Method and Apparatus', June 2009, U.S. application Ser. No. 12/455,287
[5] Nissani (Nissensohn), D. N., 'Communication and Memory Capacity Enhancement Method and Apparatus', August 2010, U.S. Pat. No. 8,307,184
[6] Sommer, N., Feder M., Shalvi, O., 'Low Density Lattice Codes', IEEE International Symposium on Information Theory, Seattle, July 2006
[7] Lang, G. R., Longstaff, F. M., 'A Leech Lattice Modem', IEEE JSAC, August 1989
[8] Forney, G. D., Gallager, R. G., Lang, G. R., Longstaff, F. M., Qureshi, S. U., 'Efficient Modulation for Band-Limited Channels', IEEE JSAC, September 1984
[9] Gallager, R. G., 'Low Density Parity Check Codes', Ph D Dissertation, MIT, 1963
[10] Yona, Y., Feder, M., 'Efficient Parametric Decoder of Low Density Lattice Codes', ISIT 2009, July 2009
[11] Viterbo, E., Boutros, J., 'A universal lattice code decoder for fading channels', IEEE Transactions on IT, July 1999
[12] Nissani (Nissensohn), D. N., 'Multi-input-multi-output wireless communication Method and Apparatus', July 2006, U.S. Pat. No. 7,583,763
[13] Forney, G. D., 'Coset Codes—Part I: Introduction and Geometrical Classification', IEEE Transactions on IT, September 1988
[14] Conway, J. H., Sloane, N. J. A., 'Fast Encoding Method for Lattice Codes and Quantizers', IEEE Transactions on IT, November 1983
[15] Duda, R. O., Hart, P. E., 'Pattern Classification and Scene Analysis', John Wiley & Sons, 1973

BACKGROUND OF THE INVENTION

Since its inception in 1995 (see Telatar [1]) Multi-Input-Multi-Output (MIMO) technology has become a keystone of wireless standards. Based upon simultaneous transmission and reception through multiple antennas, it enables information capacity increase, proportionate to the number of either transmitting or receiving antennas (specifically, to the smallest of these two). This increase, relative to transmission and reception through a single antenna at each side, is achieved with neither power nor spectrum penalty. The only cost then is merely the cost of the extra implementation hardware. MIMO has been adopted by both Wireless LAN and Cellular standards, with MIMO dimension increasing and antenna arrays as big as 8×8 being defined in next generation standards.

Error Correction Coding (ECC) methods by which the distance (as defined in some suitable abstract space) between transmitted information messages is increased, relative to the distance between uncoded messages, so that their resilience to transmission channel distortion and noise is enhanced have been known and widely utilized for more than 60 years. These codes have been traditionally designed over binary spaces. The metric defined in these spaces is usually the so called Hamming distance.

Binary ECC is implemented by mapping an information binary vector into a longer binary vector. Better error performance (i.e. lower Bit Error Rate (BER) or, equivalently, coding gain) is achieved then at the expense of extra bits. When the transmission channel is limited to a maximal signaling rate (channel uses per unit of time) longer transmission vectors are equivalent to lower information rate; so binary ECC achieves better BER than uncoded information bits at the usual penalty of lower information rate.

ECC may be also implemented in other spaces. In particular coded modulation schemes in which distinct messages are mapped in the modulated signal space, so that their Euclidean distances from each other (or other related metrics) are optimized in some way have been known for a long time (see e.g. Forney [13]). Said schemes are also known as signal coding, or signal space coding methods. An important example of this class of methods (but certainly not exclusive) is Lattice Coding (see Conway and Sloane [2]). In Lattice Coding, messages represented by, say, binary vectors are efficiently mapped into signal space, resembling efficiently packed solid spheres in a given volume; Lattice Coding falls then under the theory of Sphere Packing.

It should be noted that while we use the term Lattice Code in the sequel, the proposed invention is equally applicable to other signal space coding schemes, and adaptations of the present invention to fit such schemes should be easily made by those skilled in the art.

Since the transmitted coded message is transmitted at the same channel signaling rate as an uncoded message, then no information rate penalty is incurred in their use, and their BER coding gain comes practically for free (except of course for the cost of the implementation machinery).

As mentioned above, Lattice Codes are usually generated by mapping a (usually) binary information vector message into a suitable integer vector (i.e. a vector in which its elements are integer numbers) such that the eventually resulting lattice point is confined to a specified transmission efficient closed region of space, typically a hyper-cube or hyper-sphere; this process may be called the Lattice Encoding process (see Nissani [3], [4], [5] and Conway and Sloane [14]) or the 'shaping' process (see Sommer et al [6]); this process includes linearly acting upon this said integer vector by means of a Lattice Generator matrix, resulting in a real vector (i.e. lattice point) positioned inside said specified closed space region.

The Lattice Generator matrix columns (or in some notations, its rows) comprise in fact a basis vectors set of the Lattice Code. At the receive side, due to transmission channel and receiver effects, a noisy version of the transmitted lattice point is received. This vector is usually processed by a so called Lattice Detection method, associated with the selected Lattice Code and a lattice point, hopefully the originally transmitted, is recovered. This is then decoded by a Lattice Decoding process, the counterpart of the fore mentioned Lattice Encoding process (Nissani [3], [4], [5]) and the received information bits are then delivered to the user.

Use of Lattice Coding in communication applications has been limited so far (see Lang and Longstaff [7]). This is probably due to several factors: a. relatively few Lattice Codes were available with known and feasible Lattice Detection methods, which resulted in little flexibility to system designers, b. no general method was known for the above mentioned Lattice Encoding process (see Forney et al. [8] and, again, Sommer et al [6]); c. only moderate coding gain was achieved by those few Lattice Codes (such as the Leech lattice, denoted $L_{24}$) with feasible detection methods.

Most recently, Lattice Codes were discovered for which BER performance approximates the Shannon Capacity bounds. These Lattice Codes, called Low Density Lattice Codes (LDLC, see Sommer et al [6]) closely resemble (and were actually inspired by) the so called Low Density Parity Check (LDPC) binary codes (see Gallager [9]), which have gained wide acceptance in recent years. Like LDPC, LDLC are characterized by a sparse Lattice Generator matrix inverse (or sometimes, sparse Lattice Generator matrix itself); and the Lattice Detection process (i.e. the said process of association of the noisy received vector to a near, hopefully the nearest, lattice point) is done by probabilistic methods (e.g. message passing or belief propagation), closely resembling those of LDPC.

Concurrently, the long time said open Lattice Encoding and Decoding problem was solved in recent years by a computationally efficient, universal (i.e. suitable to any lattice) method (see Nissani [3], [4] and [5]).

The fore mentioned obstacles preventing Lattice Code acceptance seem to have now been solved: a. an arbitrary variety of Lattice Codes of different dimensions with efficient Lattice Detection methods are now developed (Yona and Feder [10]), which trade off coding gain for latency and complexity, b. a universal and computationally efficient Lattice Encoding and Decoding method was devised (Nissani [3], [4] and [5]), and c. Lattice Codes with high coding gain (close to Shannon Capacity) are contained in this family.

Outstandingly, these codes get close to Shannon Capacity bounds at no information rate penalty at all, so they may be naturally considered as a coding method of choice as bandwidth and spectrum are generally a scarce resource.

Since MIMO is a well based keystone of wireless, for Lattice Coding (and other signal space coding methods) to be adopted, it should be able to be seamlessly integrated with MIMO transmission systems, without incurring any BER performance degradation. As was already pointed out (see Sommer et al [6]) and as will be described in the sequel, direct ('natural' or 'nave') integration between MIMO and Lattice Coding will in general cause severe link (BER) performance problems.

The proposed invention presents a simple and feasible solution to these problems which enables Lattice Coded information to be transmitted through MIMO channels with no link performance penalty, i.e. practically achieving the designed coding gain.

It should be noted again that while the term Lattice Coding is used along this proposed invention, the method proposed herein is equally applicable to any other signal space coding scheme characterized by Euclidean or related metrics as the distance measure between different transmission messages.

OBJECTIVES AND ADVANTAGES OF THE INVENTION

It is the main objective of this proposed invention to present a method and corresponding apparatus to enable seamless and effective transmission of Lattice Coded information through MIMO channels.

It is the main advantage of this proposed invention to offer a simple method and corresponding apparatus which may achieve the designed Lattice Code coding gain even when transmitted across MIMO channels.

SUMMARY OF THE INVENTION

Direct or 'natural' integration of MIMO and Lattice Coding in a transmission system incurs the mapping of Lattice Code points, into MIMO transmitted vectors (MIMO lattice points, denoted m-lattice points in the sequel to prevent confusion). The MIMO signal is then propagated, in its way to the MIMO receiver, through a channel. This propagation causes a distortion of the MIMO m-lattice, so that the received m-lattice point is (aside from noise) a scaled and rotated version of the transmitted m-lattice point. This in turn, when reflected back into the Lattice Code points, causes the received lattice to have different distance properties than the original Lattice Code, i.e. the transmitted lattice; since in many Lattice Codes the distance between lattice points is tightly controlled for optimal coding gain, the change in this distance would usually cause significant coding gain degradation.

In addition, the said received lattice is now represented by a different Lattice Generator matrix. In the case of LDLC this change in Lattice Generator matrix is reflected in loss of sparseness and other properties of the Lattice Generator matrix inverse (or the Lattice Generator matrix itself, depending on implementation), which are essential for state of the art LDLC detection methods; these problems are well known (see e.g. Sommer et al [6] where it is stated that, ' . . . Therefore, the usage of LDLC for MIMO systems is a topic for further research').

It is reasonably assumed, in the context of this proposed invention, that the MIMO propagation channel, represented by a matrix, is nearly time invariant during the transmission of a packet or burst, or, if varying, its time variations are reasonably tracked by means which are well known to those skilled in the art. It is also assumed in the context of the present invention that an estimate of the MIMO channel matrix is made available to the receiver prior to the beginning of the Lattice Code detection process, with estimate updates during transmission if required.

A vital observation in the context of the present invention is that while the distance ratios between, say, several neighboring received m-lattice points, is not conserved (relative to the distance ratios of the corresponding transmission m-lattice points) the general lattice structure is conserved. This means, for example, that the ratio of the distances between 3 collinear received m-lattice points, and in particular between m-lattice points residing along a single m-lattice basis vector, are, actually preserved (while the ratio of distances between non-collinear points is not preserved).

This key observation is exploited in the present invention: in a selected embodiment, instead of encoding the information by means of a single Lattice Code and then directly mapping the resulting lattice points into the m-lattice points, the information bits block is splitted into several sub-blocks (specifically at least as many sub-blocks as the MIMO m-lattice dimension). Each of these sub-blocks is then separately Lattice Encoded by existing means (such as Nissani [3], [4]

and [5]) and each resulting Lattice Code lattice point vector is then serialized; the serialized coordinates (scalar numbers) of each such Lattice Code vector are sequentially transmitted, during consequent time slots, on a selected dimension of the MIMO m-lattice (the term 'dimension' as used in the sequel interchangeably denotes the minimal number of spanning vectors required to span the MIMO signal space, or any distinct MIMO space spanning vector; the actual meaning should be clear from the context).

The transmitted m-lattice vectors are propagated and distorted by the transmission channel. The distorted received m-lattice points are not immediately detected as in the direct or 'natural' said method of MIMO and Lattice Codes integration. Rather, in said selected embodiment of this proposed invention, each m-lattice received vector is de-rotated (and de-scaled) by means of the inverse of an estimate of the channel matrix; the resultant vector is (up to the estimated channel matrix error) a noisy version of the transmitted m-lattice point. These vectors, received and gathered during consequent time slots (as many as the dimension of the Lattice Code), are separated into their components (as many as the MIMO m-lattice dimension); each separated sub-block is then parallelized and input into a Lattice Code detector.

Since each Lattice Code is fed by lattice coordinates which were all transmitted along a single MIMO dimension, the distances of the original transmitted Lattice Code are preserved (up to errors caused by imperfect channel estimate). The Lattice Code lattice points may then be detected by well known specialized (as opposed to universal) Lattice Code detectors (such as Yona and Feder [10]) and achieve similar BER results as if transmitted through a simple (i.e. non-MIMO) channel. The detected lattice points are then Lattice Decoded (again Nissani [3], [4] and [5]). Finally, since different MIMO basis vectors are affected by different noise variance (as will be explained in the sequel), then different Lattice Code points will generally yield different BER; if this is undesirable interleaver and de-interleaver functions may be inserted at the transmitter and receiver side correspondingly.

DETAILED DESCRIPTION OF THE INVENTION

Figure 1:
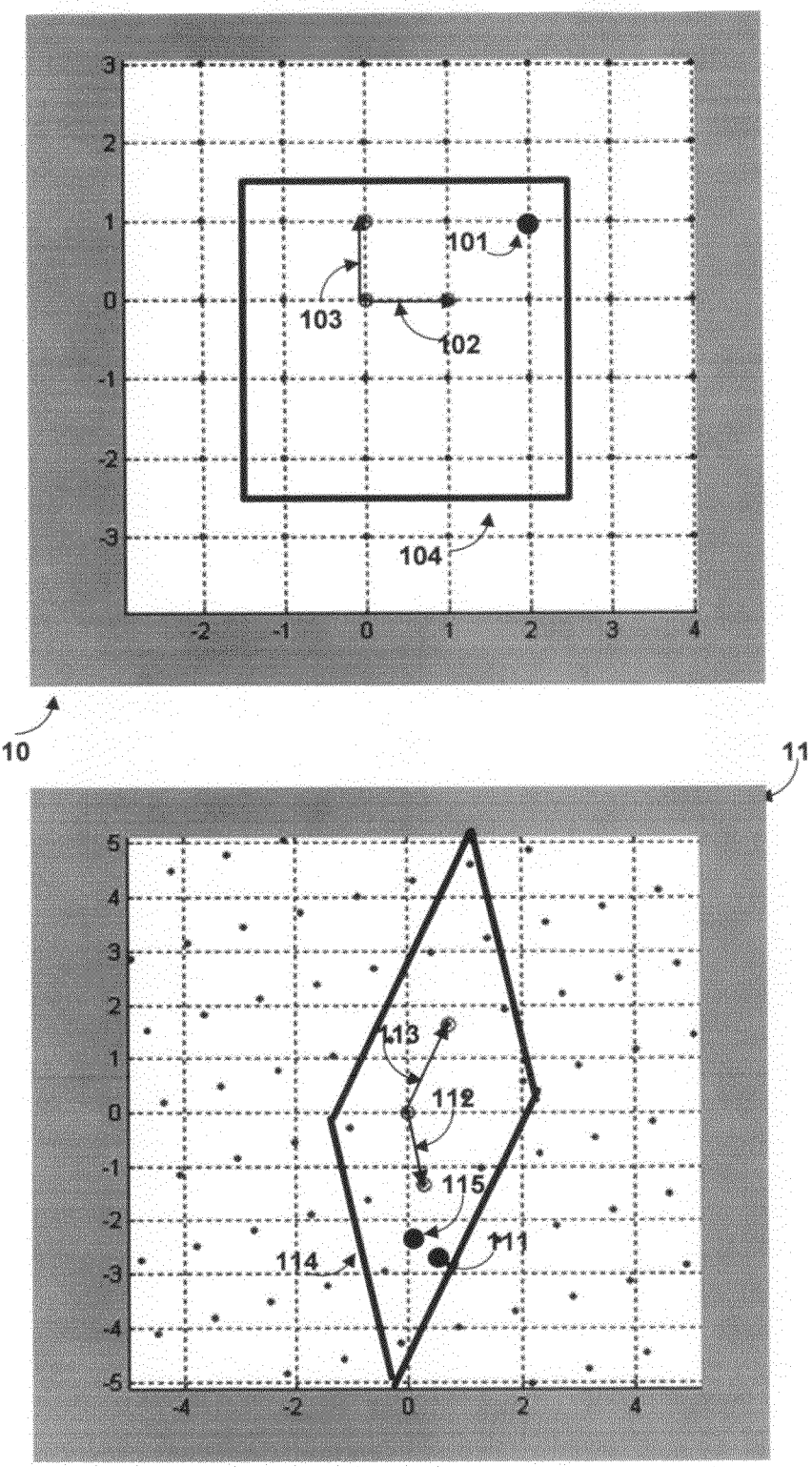
FIG. 1 presents transmitted and received m-lattices of a MIMO transmission system.

FIG. 1 presents transmission and reception MIMO m-lattices related to the exposition of the present invention. A transmission m-lattice of a simple (M=) 2 dimensional MIMO system, 4-PAM (Pulse Amplitude Modulation) real modulation is depicted in 10 of FIG. 1. Generalization to M>2 sub-streams and to more common complex modulations is straightforward and could be easily devised by anyone reasonably skilled in the art. Such transmission m-lattices are essentially an infinite set of regularly spaced points in a multi-dimensional space. Any m-lattice point x 101 can be conveniently described by means of an integer linear combination of basis column vectors $a_1$ 102 and $a_2$ 103, namely $$x = n_1 a_1 + n_2 a_2 = An \quad (1)$$

where $n = (n_1\ n_2)^t$ is any integer vector, $A = [a_1\ a_2]$ is a MIMO Lattice Generator matrix composed of the m-lattice basis vectors $a_1 = (1\ 0)^t$ 102 and $a_2 = (0\ 1)^t$ 103, and where '$(\ )^t$' denotes the vector or matrix transpose operator.

In a typical MIMO communication system transmission constellations are confined to a bounded region 104 of the m-lattice space 10, such as an hyper-cube (square in our simple case) or a hyper-sphere. An m-lattice vector x 101 can then be selected for transmission, subject to equation (1) and to the said confinement constraint, and then transmitted through the MIMO channel.

The array of received points shown in 11 of FIG. 1, such as the point r 111, though rotated and scaled by the random channel matrix H, maintain the general lattice structure. Any received point such as r 111 is expressed by $$r = Hx = HAn = Bn = n_1 b_1 + n_2 b_2 \quad (2)$$

where $B = H\ A = [b_1\ b_2] = [Ha_1\ Ha_2]$ may be considered the reception m-lattice Generator Matrix, composed of reception basis vectors $b_1$ 112 and $b_2$ 113, and where receiver noise has been momentarily omitted. Hence the array of received points maintains the general lattice structure, but the basis vectors of the reception m-lattice are rotated and scaled. This scaling and rotation is in general different for different basis vectors so that a different m-lattice with different distance properties than those of the transmitted m-lattice results.

It can be further observed from 11 of FIG. 1 that the reception bounded region 115 of the reception m-lattice 11 has been also scaled and rotated and is not an hyper-cube (square) anymore.

It should be still further observed that the transmitted m-lattice point x 101 of 10 described by its integer vector n (aside of its Lattice Generator matrix A) has been transformed to the received m-lattice point r 111 of 11, residing inside the reception bounded region and preserving the same integer descriptive vector n. In a MIMO system any reception m-lattice point such as the point r 111 is also affected by receiver noise, so that the actual received point y 115 is $$y = r + z = B\ n + z \quad (3)$$

where the noise z is usually assumed to be i.i.d. and normally distributed.

It is the main function of an optimal MIMO Lattice Detector to associate any noisy received vector such as y 115 of 11 to the closest reception m-lattice point, such as r 111 in 11 of FIG. 1. Since the transmission channel is usually random, the received m-lattice is of general (i.e. not a-priori specified) structure. Universal Lattice Detection methods for such general m-lattices can be used in these cases, such as the well known Sphere Decoding (see Viterbo and Boutros [11]) or the more efficient Directional Lattice Descent method (see Nissani [12]). Another, simple universal Lattice Detection method exists, denoted Zero Forcing, by which the said received vector y is first de-rotated by the inverse of a channel matrix estimate $\hat{H}^{-1}$ (the superscript '^' here and elsewhere denotes an estimate) and then rounded or 'sliced'; however, said de-rotation has the severe effect of correlating the fore mentioned receiver i.i.d. noise z (transforming it into the 'colored' $\hat{H}^{-1}$ z noise) and significantly modifying the optimal decision surfaces (see e.g. Duda and Hart [15]), so that the resulting BER is severely impaired (relative to optimal detection).

The transmitted m-lattice 10 of FIG. 1 can be also interpreted as a Lattice Code of dimension L=2, with orthogonal basis vectors (i.e. with A=I, the identity matrix) and lattice points p=A n. This Lattice Code is called the cubic or integer lattice, and is usually denoted by $Z_L$ (i.e. $Z_2$ since L=2 in our simple example). Since no special effort is made in efficiently placing the lattice points of $Z_2$ so that a greater distance between neighboring lattice points results (while maintaining the same number of points in a given volume), then this trivial Lattice Code is also usually denoted as 'uncoded' transmission.

Interpreting 10 of FIG. 1 as a Lattice Code shows that direct or 'natural' MIMO and Lattice Code integration implies in fact, in the simple case where the MIMO and Lattice Codes dimensions are equal (i.e. L=M), just simply transmitting the lattice point itself, i.e. setting the transmitted vector x=p. In contrast with the proposed invention, as will be shown in the sequel, a single Lattice Code point is calculated at a time and is directly mapped into the MIMO m-lattice transmission vector (or consecutive vectors if L>M).

Denote by N the number of possible different messages carried by a Lattice Code, that is the number of Lattice Code points enclosed in said lattice (say hyper-cubic) bounded region such as 104 of 10 of FIG. 1. The number of information bits carried by each such message is $\log_2(N)$; and the number of information bits per dimension of the said Lattice Code, denoted by D, is $D=\log_2(N)/L$ where L is (as defined above) the Lattice Code dimension. By inspection of 104 of 10 of FIG. 1 we note that N=16, and since L=2 (in this illustrative case) D=2 (D needs not be an integer in the general case, see e.g. Nissani [3], [4], [5]).

Figure 2:
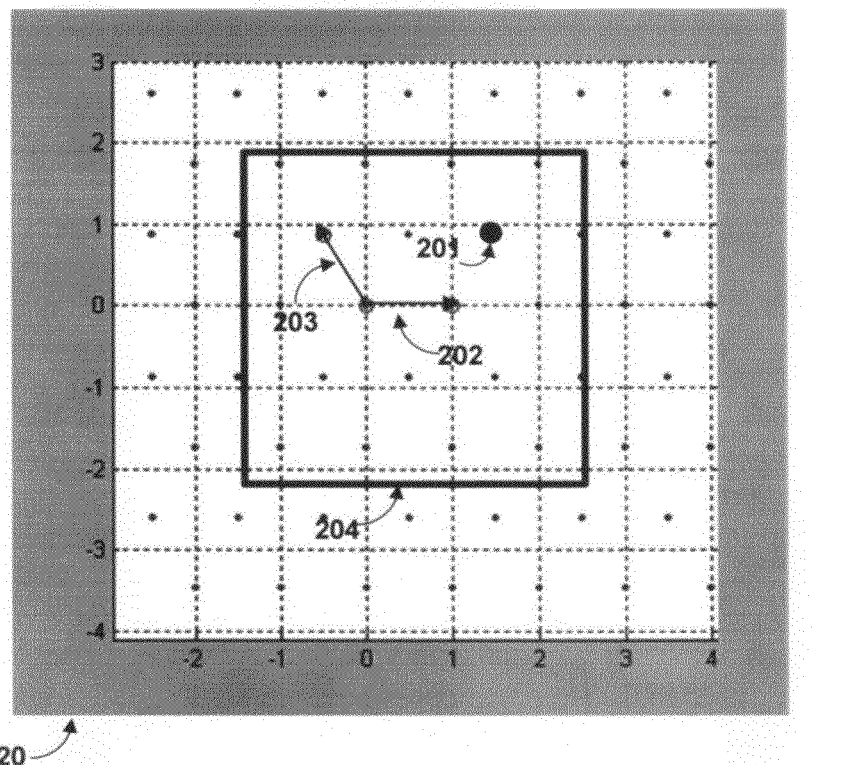
FIG. 2 shows a Lattice Code and the effects of a direct or 'natural' integration of MIMO and Lattice Codes, in accordance with current art.
Figure 2:
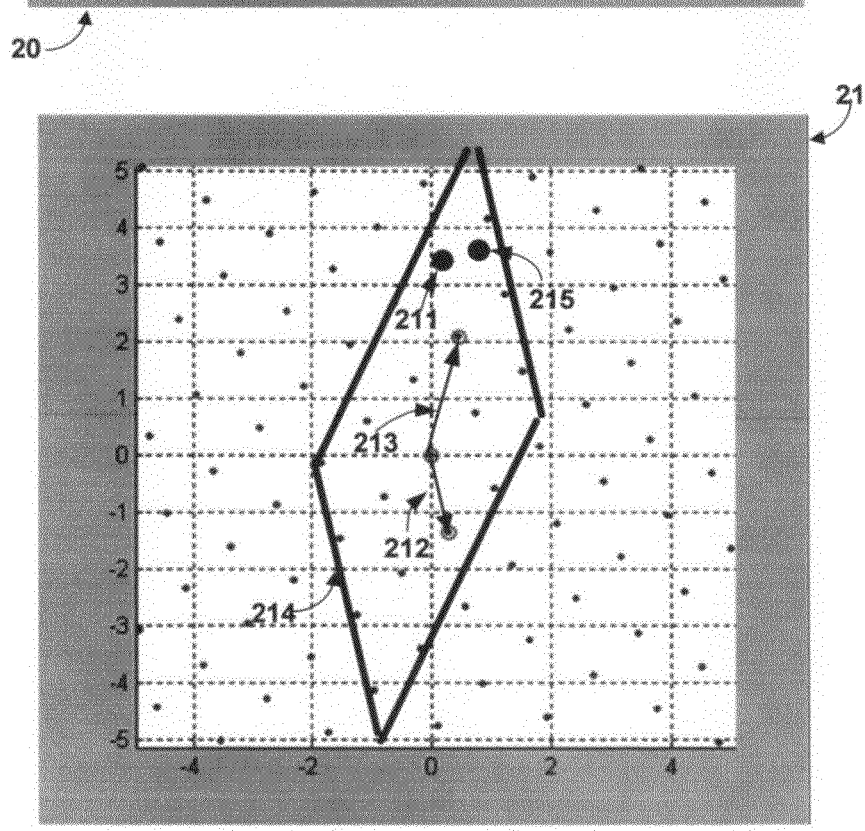

We now turn our attention to FIG. 2 which illustrates the severe problem (pointed out by e.g. Sommer et al [6] as mentioned above) resulting from directly or 'naturally' integrating MIMO and Lattice Codes. Refer to 20 of FIG. 2, which we shall first interpret as a Lattice Code with generator matrix $A=[a_1\ a_2]$ with basis vectors $a_1=(1\ 0)^t$ 202 and $a_2=(-\frac{1}{2}\ \text{sqrt}(3)/2)^t$ 203. This is the densest lattice in $R^2$: a specified bounded region such as the hyper-cube 204 is able to contain a given number of lattice points with maximal distance between neighboring points (compared with any other lattice in $R^2$). This Lattice Code is usually denoted $A_2$ and its fore mentioned distance property ensures the highest coding gain out of all other lattices in $R^2$ (though still low, because of its small dimension L=2).

As with the cubic lattice of FIG. 1, its lattice points such as p 201 may be described by p=A n, with n an integer vector. Lattice Encoding, that is mapping between binary information bits and an integer vector n so that the resulting point p is confined to a bounded region of the lattice space (such as an hyper-cube 204 of 20) is not trivial anymore as was for the cubic lattice depicted in 10 of FIG. 1 and should be implemented by such means as described in Nissani [3], [4] and [5].

Direct or 'natural' MIMO and Lattice Code integration, just as in the said case of the cubic Lattice Code of FIG. 1 above, would mean to simply transmit the Lattice Code points, i.e. x=p (assuming for simplicity as before that L=M).

In the more general and typical case, with L>M, such direct MIMO and Lattice Code integration would imply, in terms of implementation: a. picking D×L information bits, b. Lattice Encoding said bits into a single confined Lattice Code point of dimension L, c. mapping said Lattice Code point into MIMO m-lattice points, M coordinates at a time slot, till all L coordinates are used (L/M total time slots, assuming for simplicity and w.l.o.g. that L/M is an integer), d. transmitting the m-lattice point through a channel H during said L/M time slots, e. detecting at the receiver side, either a single received m-lattice vector at each time slot, or the aggregate of L/M m-lattice vectors received over consecutive time slots, in both said cases by means of a said universal Lattice Detector, and, f. Lattice Decoding the detected vector(s) back into L×D information bits.

Note that aggregating said L/M noisy received MIMO vectors (such as 211 of 21) during L/M time slots as mentioned above, and then executing said Lattice Code specialized Lattice Detection (rather than said universal Lattice Detection as described above) is not an option since (as will momentarily be described) the received Lattice Code Generator matrix will in general be significantly modified by the transmission channel.

The transmitted m-lattice vector x 201 is transmitted through a MIMO propagation channel described by its matrix H. Just as in FIG. 1 above, the channel separately rotates and scales each of the basis vectors as is shown by $b_1$ 212 and $b_2$ 213 of 21 of FIG. 2. This may severely distort the carefully designed distance properties of the original (transmitted) Lattice Code $A_2$ which in general results in significantly degraded BER and coding gain.

In addition, at the receiver side, the Lattice Code generator matrix is modified from A to B=HA. In the case of LDLC this causes loss of said sparseness property in the Lattice Generator matrix inverse (or in some Lattice Code implementations, in the generator matrix itself) which is essential for efficient Lattice Detection. Similarly, for other Lattice Codes, characterized by algebraic detection methods (such as the Leech $L_{24}$ lattice, see Lang and Longstaff [7]) this generator matrix modification impedes application of known and efficient detection methods. As result of this, a noisy received vector such as 211 of 21 of FIG. 2 cannot be efficiently associated to its nearest Lattice Code point 215 of 21.

It should be noted that these severe problems of distances distortion and Lattice Generator matrix modification similarly occur for the (more typical) cases whereby L>M in which the direct or 'natural' integration of MIMO and Lattice Codes is implemented by mapping coordinates of the Lattice Code vector into an m-lattice point, a few coordinates at a time slot, during consequent time slots, till the whole vector is transmitted (as described above). Similarly, the same problems persist regardless of whether the lattices (either Lattice Code, MIMO m-lattice or both) are defined over the real or complex numbers fields.

Finally, it should be noted that although distances between neighboring received m-lattice points is severely distorted, the general lattice structure of the received points set is preserved. In particular neighboring collinear points (e.g. points along any selected m-lattice basis vector) preserve, after reception, equal distances between themselves. This observation is vital to our herein proposed invention.

It is the main idea behind this invention to a. split an information data bits block into M (or more) separate sub-blocks, i.e. (at least) as many as the MIMO dimension, optionally interleaved, b. separately code each said sub-block by means of a Lattice Code resulting in M (or more) Lattice Code points, each of dimension L, c. transmit the coordinates of each said Lattice Code point, sequentially during L time slots, each said Lattice Code point through a selected MIMO m-lattice dimension. Since, as explained above in the context of FIG. 2, the MIMO channel preserves the general lattice structure, so that distances along basis vectors are conserved (up to a scalar multiplication) then the precise and original Lattice Code structure is preserved, efficient specialized Lattice Detection methods can be applied, and the maximal possible coding gain can be achieved.

Figure 3:
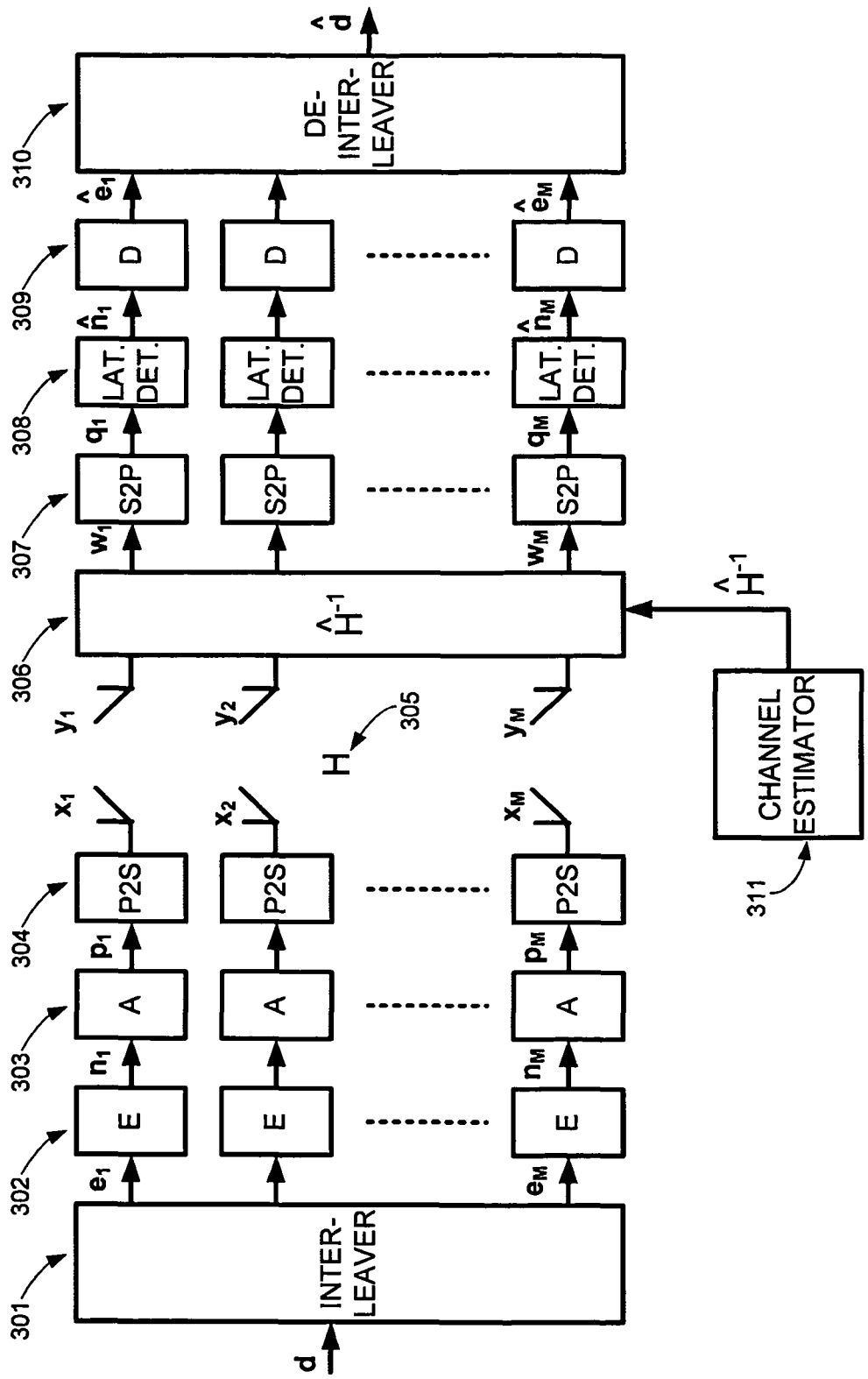
FIG. 3 describes a selected embodiment of the proposed invention.

We refer now to FIG. 3 which depicts a selected embodiment of the herein proposed invention. A block, denoted d, of information bits, of length L×D×M is fed into a block Interleaver 301 which spreads (for reasons that will become clear ahead) the information bits d into M sub-blocks, denoted i=1, 2, ..., M, each of length L×D. Each sub-block $e_i$ is separately Lattice Encoded into a distinct lattice point integer vector descriptor $n_i$, i=1, 2, ..., M by a Lattice Encoder E 302 (which implements a method such as Nissani [3], [4], [5]); the said lattice point descriptors $n_i$ are multiplied by the Lattice Code generator matrix A as indicated by 303; by merit of said Lattice Encoding E 302 the resulting lattice point $p_i = A\, n_i$, i=1, 2, ..., M, is confined to a bounded region of the lattice space such as an hyper-cube or hyper-sphere. Said M lattice points $p_i$, are fed as L dimensional vectors into Parallel to Serial (P2S) converters 304, from which they exit, one coordinate at each transmission time slot. These M coordinates are represented by $x_i(l)$ i=1, 2, ..., M, l=1, 2, ..., L (index l is omitted from FIG. 3 for the sake of clarity); the vector x(l) is in fact the MIMO transmitted m-lattice vector at a given time slot 1.

The transmitted MIMO vector x(l) is propagated through the channel, represented by the matrix H 305. As mentioned above in the context of FIGS. 1 and 2, the channel rotates and scales the transmitted vector x(l) and adds noise z(l), usually assumed normal and i.i.d., thus $$y(l) = H x(l) + z(l)\ l = 1, 2, \ldots, L \qquad (4)$$

where the channel matrix H 305 is assumed memoryless, and constant or slowly varying with time.

The M components of the noise vector z(l) have, by usual assumption, identical variance; however, since the m-lattice basis vectors have been separately scaled, these said vectors will generally vary in their norms, hence the Signal-to-Noise Ratio (SNR) of different m-lattice basis vectors will generally vary; this fact will be elaborated in later paragraphs.

In the selected embodiment of our present invention, the received vector y(l) will not be detected by a (universal) MIMO Lattice Detector as in the direct or 'natural' MIMO and Lattice Code integration scheme described above in the context of FIG. 2.

Instead, in said selected embodiment of this proposed invention, each received vector y(l) is de-rotated (and de-scaled) by the channel matrix estimate, denoted $\hat{H}^{-1}$ 306. This channel matrix estimate is calculated in Channel Estimator 311 by means well known to those skilled in the art; if the channel H is reasonably time invariant during the transmission of L time slots then a single estimate is sufficient; otherwise channel estimate updates may be calculated and fed into 306. Following this de-rotation we have $$w(l) = \hat{H}^{-1} H x(l) + z(l) \approx x(l) + \hat{H}^{-1} z(l)\ l = 1, 2, \ldots, L \qquad (5)$$

so w(l) is a noisy (due to the noise ($\hat{H}^{-1} z(l)$)) and approximate (due to channel estimate errors) reconstruction of the transmitted vector x(l).

It is important to note, and a key feature of this proposed invention, that although the de-rotated noise vector is now correlated ('colored') as was noted above in the context of FIG. 1, this is not a degrading effect anymore, since detection will not be conducted upon vectors w(l) of dimension M but upon vectors $q_i$ of dimension L (as will be momentarily described) all affected by i.i.d. noise.

The different components of the de-rotated vectors w(l) are in general still subject to different SNR as mentioned above.

The de-rotated vectors w(l) are hereon treated componentwise; for each of M m-lattice dimensions, L consecutive components $w_i(l)$, i=1, 2 ..., M, l=1, 2 ..., L, are received during L time slots and are converted into a vector $q_i$ of dimension L by means of a Serial-to-Parallel (S2P) converter 307. As mentioned above the L components of each of these M vectors are affected by statistically independent (assuming memoryless channel, as is usually the case) noise of identical variance (though, as mentioned above, the variances of different vectors $q_i$, i=1, 2 ..., M, will generally differ).

Since the Lattice Code original structure is precisely preserved during this process (except for implementation impairments such as channel estimator errors) as explained above, then each of these M vectors $q_i$ can be detected by means of a specialized Lattice Detector 308 resulting in an estimated integer vector $\hat{n}_i$, i=1, 2, ..., M; for example, if the selected Lattice Code is an LDLC then Lattice Detector 308 may be implemented by methods such as those described in Yona and Feder [10], etc. Each of the M detected integer vectors $\hat{n}_i$, i=1, 2 ..., M is then decoded by a Lattice Decoder D 309, the inverse operation of said Lattice Encoder E 302, resulting in M binary estimated sub-blocks $\hat{e}_i$ of length L×D bits. Finally these M sub-blocks are de-interleaved by means of De-Interleaver 310 resulting in estimated information block $\hat{d}$.

As described above, the different received m-lattice basis vectors have in general different SNR; to evenly distribute detection errors in the block $\hat{d}$ the selected embodiment of the present invention included an Interleaver and De-Interleaver pair; other embodiments of this invention may omit this operation.

In the selected embodiment of the proposed invention a channel de-rotation (and de-scaling) $\hat{H}^{-1}$ 306 operation was included at the receiver side. In other embodiments the received vector y may be instead projected upon the distinct m-lattice basis vectors $b_i$; in this case the noise of different m-lattice dimensions will be of equal variance, but the SNR of different noisy Lattice Code points $q_i$ will still vary due to said basis vectors usually different norms, resulting in coding gain (of each individual Lattice Code) similar to that of the selected embodiment.

In some embodiments of the proposed invention the depicted parallel machinery 302 to 304 at the transmitter side and/or 307 to 309 at the receiver side can be implemented by shared resources and need not be physically distinct entities.

While the selected embodiment of the proposed invention made explicit use of Lattice Codes, this proposed invention should be equally applicable to other signal space coding techniques (such as, but not limited to, those referred above); in particular, these include all those that make use of Euclidean or related metrics (rather than Hamming or related binary metrics) to distinguish amongst different messages. Adaptation to these other said techniques should be easily done by those skilled in the art.

Other embodiments of the proposed invention may include transmitted and received vectors defined over the complex numbers field (rather than over the real numbers field as in the selected embodiment); adaptations to such complex constellations (and associated channel matrix) should be easily made by those skilled in the art.

The present proposed invention is equally applicable to single carrier MIMO as well as to other, multi-carrier schemes (such as MIMO-OFDM); adaptations to these schemes should be easily made by those skilled in the art.

Some MIMO schemes are based upon non-availability of channel state information at the transmitter side; some are based upon knowledge, full or partial of channel state information at said transmitter side. The proposed invention is equally applicable to both, and adaptations to each should be easily made by those skilled in the art.

The selected embodiment of the proposed invention assumed an equal number of antenna elements at both the transmitter and receiver sides of the MIMO system, or equivalently, a square channel matrix H 305. Other embodiments may contain a different number of antenna elements at each side (equivalently, a non-square channel matrix H 305); adaptations to these schemes should be easily made by those skilled in the art.

The selected embodiment of the proposed invention has assumed that identical Lattice Codes (represented by operators E 302 and A 303 in FIG. 3) are applied to all m-lattice dimensions. In other embodiments different Lattice Codes may be applied to different m-lattice dimensions, for example (but not limited to) where channel state information is available at the transmitter side; adaptations to these schemes should be easily made by those skilled in the art.

In the selected embodiment of the proposed invention the information block was divided into precisely as many sub-blocks as the dimension of said m-lattice. In other possible embodiments of this proposed invention the information block may be divided into a number of sub-blocks greater than said m-lattice dimension; in such embodiments more than a single Lattice Code would be encoded on some or all of m-lattice dimensions, the vital point still being that no Lattice Code be encoded and transmitted upon more than one single said m-lattice dimension.

What is claimed is:

1. A method for lattice coding of information transmitted through a multi-input-multi-output communication system, wherein said method comprises:
   splitting said information into a plurality of sub-blocks;
   separately lattice coding each of said sub-blocks to obtain respective lattice point vectors, each of said lattice point vectors comprising a plurality of coordinate;
   transmitting said lattice point vectors in parallel, wherein each of said lattice point vectors is transmitted on a respective single dimension of said multi-input-multi-output communication system, and wherein said lattice point vector coordinates are transmitted sequentially over multiple time slots.

2. The method of claim 1, wherein different lattice codes are used for coding at least of said sub-blocks.

3. The method of claim 1, wherein said information is interleaved prior to said splitting.

4. The method of claim 1, wherein said separate lattice codings are performed utilizing shared resources.

5. The method of claim 1, wherein said lattice coding is implemented over the real number field.

6. The method of claim 1, wherein said transmitting of said lattice point vectors is effected by single carrier modulation.

7. The method of claim 1, wherein channel state information is available at a transmission side of said multi-input-multi-output communication system.

8. The method of claim 1, wherein channel state information is not available at a transmission side of said multi-input-multi-output communication system.

9. The method of claim 1, wherein said lattice coding is implemented over the complex number field.

10. The method of claim 1, wherein said transmitting of said lattice point vectors is effected by multi-carrier modulation.

11. The method of claim 1, wherein said multi-input-multi-output communication system comprises an unequal number of antenna elements at each side.

12. A transmission apparatus for lattice coding of information transmitted through a multi-input-multi-output communication system, said apparatus comprising:
   a plurality of encoders, wherein each of said encoders is configured to lattice code respective sub-blocks of a data stream to obtain a respective lattice point vector, each of said lattice point vectors comprising a plurality of coordinates; and
   a plurality of parallel-to-serial converters, wherein each of said parallel-to-serial converters is associated with a respective encoder and is configured to serialize said respective lattice point vector for transmission over a respective single dimension of said multi-input-multi-output communication system, and wherein said lattice point vector coordinates are transmitted sequentially over multiple time slots.

13. A transmission apparatus in accordance with claim 12, wherein said plurality of encoders utilize shared physical resources.

14. A transmission apparatus in accordance with claim 12, further comprising an information interleaver configured to split said data stream into said sub-blocks.

15. A transmission apparatus in accordance with claim 12, wherein said plurality of encoders utilize separate physical resources.

16. A reception apparatus for lattice detecting and decoding of information transmitted through a multi-input-multi-output communication system, said apparatus comprising:
   a plurality of serial-to-parallel converters, each configured to group coordinates into a respective lattice code vector, wherein said coordinates are received sequentially over a respective single dimension of said multi-input-multi-output communication system; and
   a plurality of lattice code detector/decoder pairs, wherein each of said detector/decoder pairs is associated with a respective serial-to-parallel converter and is configured to lattice detect and decode said respective vector into an estimate of a data sub-block, such that each of said detector/decoder pairs is applied to a corresponding respective dimension of said multi-input-multi-output communication system.

17. A reception apparatus in accordance with claim 16, wherein said plurality of lattice detector/decoder pairs utilize shared physical resources.

18. A reception apparatus in accordance with claim 16, further comprising a channel de-rotator configured to de-rotate a received signal prior to processing by serial-to-parallel converters.

19. A reception apparatus in accordance with claim 16, further comprising a de-interleaver associated with said plurality of lattice detector/decoder pairs, configured to combine said estimated data sub-blocks into an output data stream.

20. A method for signal space coding of information transmitted through a multi-input-multi-output communication system, wherein said method comprises:
   splitting said information into a plurality of sub-blocks;
   separately signal space coding each of said sub-blocks to obtain respective signal space code vectors, each of said signal space code vectors comprising a plurality of coordinates;
   transmitting said signal space code vectors in parallel, wherein each of said signal space code vectors is transmitted on a respective single dimension of said multi-input-multi-output communication system, and wherein said signal space code vector coordinates are transmitted sequentially over multiple time slots.

* * * * *